United States Patent
Kim (10) Patent No.: US 9,437,846 B2
(45) Date of Patent: Sep. 6, 2016

(54) SECONDARY BATTERY

(71) Applicants: Samsung SDI Co., Ltd., Yongin-si, Gyeonggi-do (KR); Robert Bosch GmbH, Stuttgart (DE)

(72) Inventor: Duk-Jung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 432 days.

(21) Appl. No.: 13/869,877

(22) Filed: Apr. 24, 2013

(65) Prior Publication Data
US 2014/0212741 A1    Jul. 31, 2014

(30) Foreign Application Priority Data
Jan. 28, 2013    (KR) .................. 10-2013-0009505

(51) Int. Cl.
H01M 2/08    (2006.01)
H01M 2/30    (2006.01)
H01M 2/06    (2006.01)
H01M 2/22    (2006.01)

(52) U.S. Cl.
CPC .................. *H01M 2/06* (2013.01); *H01M 2/08* (2013.01); *H01M 2/22* (2013.01); *H01M 2/30* (2013.01); *H01M 2/305* (2013.01)

(58) Field of Classification Search
None
See application file for complete search history.

(56) References Cited

U.S. PATENT DOCUMENTS

2011/0200870 A1    8/2011    Kim et al.
2011/0311863 A1*  12/2011    Byun et al. .................. 429/181
2012/0058388 A1*   3/2012    Kim ...................... H01M 2/305
                                                                  429/179

FOREIGN PATENT DOCUMENTS

JP      2007-134233         5/2007
JP      2011-210720    *  10/2011
JP      2012-049076         3/2012
KR      10-2008-0039090 A   5/2008
KR      10-2011-0093372 A   8/2011

OTHER PUBLICATIONS

Machine English Translation of JP 2007-134233, Patent Abstracts of Japan, 18 pages.
Machine English Translation of JP 2012-049076, Patent Abstracts of Japan, 27 pages.

* cited by examiner

*Primary Examiner* — Jonathan Crepeau
(74) *Attorney, Agent, or Firm* — Lewis Roca Rothgerber Christie LLP (57) ABSTRACT

Provided is a secondary battery including: an electrode assembly; a case housing the electrode assembly and having a case opening; a cap plate substantially sealing the case opening; a first terminal plate on the cap plate; a first collector terminal coupling the electrode assembly to the first terminal plate; and a seal gasket between the first collector terminal and the cap plate, wherein the first collector terminal includes: a lower terminal adjacent the electrode assembly, and an upper terminal adjacent the first terminal plate, the upper terminal including a first metal different from a second metal of the lower terminal, and contacting the lower terminal at an interface between the first metal and the second metal, and wherein the seal gasket covers at least a portion of a side surface of the interface between the first metal and the second metal.

18 Claims, 7 Drawing Sheets

SECONDARY BATTERY

CROSS-REFERENCE TO RELATED APPLICATION

This application claims priority to and the benefit of Korean Patent Application No. 10-2013-0009505, filed on Jan. 28, 2013, in the Korean Intellectual Property Office, the disclosure of which is incorporated herein in its entirety by reference.

BACKGROUND

1. Field

One or more embodiments of the present invention relate to a secondary battery.

2. Description of the Related Art

Generally, unlike a primary battery that is not designed to be re-charged, a secondary battery is capable of being charged, discharged, and re-charged. The secondary battery is used as an energy source for mobile devices, electric cars, hybrid cars, electric bicycles, uninterruptible power supply apparatuses, and/or the like. Here, the secondary battery may be used in a single battery type or a battery module type, wherein a plurality of batteries are electrically coupled to each other in one unit, according to the type of external device applied to the secondary battery.

SUMMARY

One or more embodiments of the present invention include a secondary battery, wherein a corrosion-resistant characteristic of a multi-metal terminal is improved.

Additional aspects will be set forth in part in the description which follows and, in part, will be apparent from the description, or may be learned by practice of the presented embodiments.

According to one or more embodiments of the present invention, a secondary battery includes: an electrode assembly; a case housing the electrode assembly and having a case opening; a cap plate substantially sealing the case opening; a first terminal plate on the cap plate; a first collector terminal coupling the electrode assembly to the first terminal plate; and a seal gasket between the first collector terminal and the cap plate, wherein the first collector terminal includes: a lower terminal adjacent the electrode assembly, and an upper terminal adjacent the first terminal plate, the upper terminal including a first metal different from a second metal of the lower terminal, and contacting the lower terminal at an interface between the first metal and the second metal, and wherein the seal gasket covers at least a portion of a side surface of the interface between the first metal and the second metal.

The first collector terminal may extend at least partially through a terminal hole of the cap plate, and the seal gasket may be along a side surface of the terminal hole.

The first terminal plate may include a protruding portion protruding toward the seal gasket and around a terminal hole of the first terminal plate.

The protruding portion may be continuous along a periphery of the terminal hole.

The seal gasket may contact the first terminal plate and may include a flange-shaped upper portion.

The secondary battery may further include an insulating member between the first terminal plate and the cap plate, wherein at least a portion of the upper portion of the seal gasket is compressed between the first terminal plate and the insulating member.

A width of the upper portion of the seal gasket may be larger than a width of a portion of the seal gasket in a terminal hole of the cap plate.

The seal gasket may extend along a length direction of the first collector terminal and may cover at least the interface between the first metal and the second metal.

At least a portion of an upper portion of the seal gasket may be vertically offset above the interface between the first metal and the second metal.

The upper terminal may be compressed and fixed with respect to a top surface of the first terminal plate, and the lower terminal may be coupled to a first collector member that is electrically coupled to the electrode assembly.

A top of the upper terminal may have a flange shape for engaging the first terminal plate.

The lower terminal may include a stopper having a width greater than a terminal hole of the cap plate, and the first collector terminal may extend through the terminal hole.

The first terminal plate may include a metal substantially similar to the first metal, and the first collector member may include a metal substantially similar to the second metal.

The secondary battery may further include a second collector terminal having a polarity different from a polarity of the first collector terminal.

The second collector terminal may extend through the cap plate to electrically couple the electrode assembly to a second terminal plate, and the second collector terminal may further include a lower terminal adjacent the electrode assembly and an upper terminal adjacent the second terminal plate.

The lower terminal and the upper terminal of the second collector terminal may further include a same metal or substantially similar metals.

The upper terminal of the second collector terminal may be compressed and fixed with respect to a top surface of the second terminal plate, and the lower terminal of the second collector terminal may be coupled to a second collector member that is electrically coupled to the electrode assembly.

The upper terminal and the lower terminal of the second collector terminal may include a same metal or substantially similar metals as the second terminal plate and the second collector member.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1:
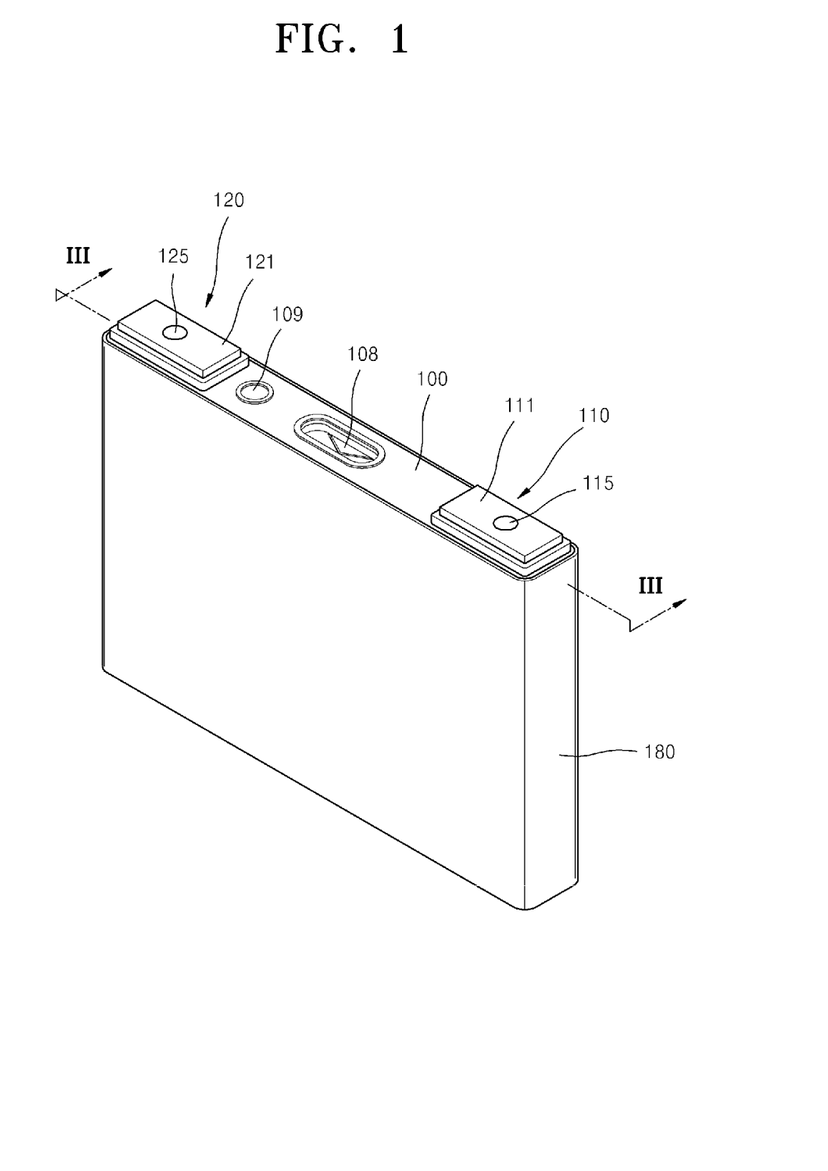
FIG. 1 is a perspective view of a secondary battery according to an embodiment of the present invention.
Figure 2:
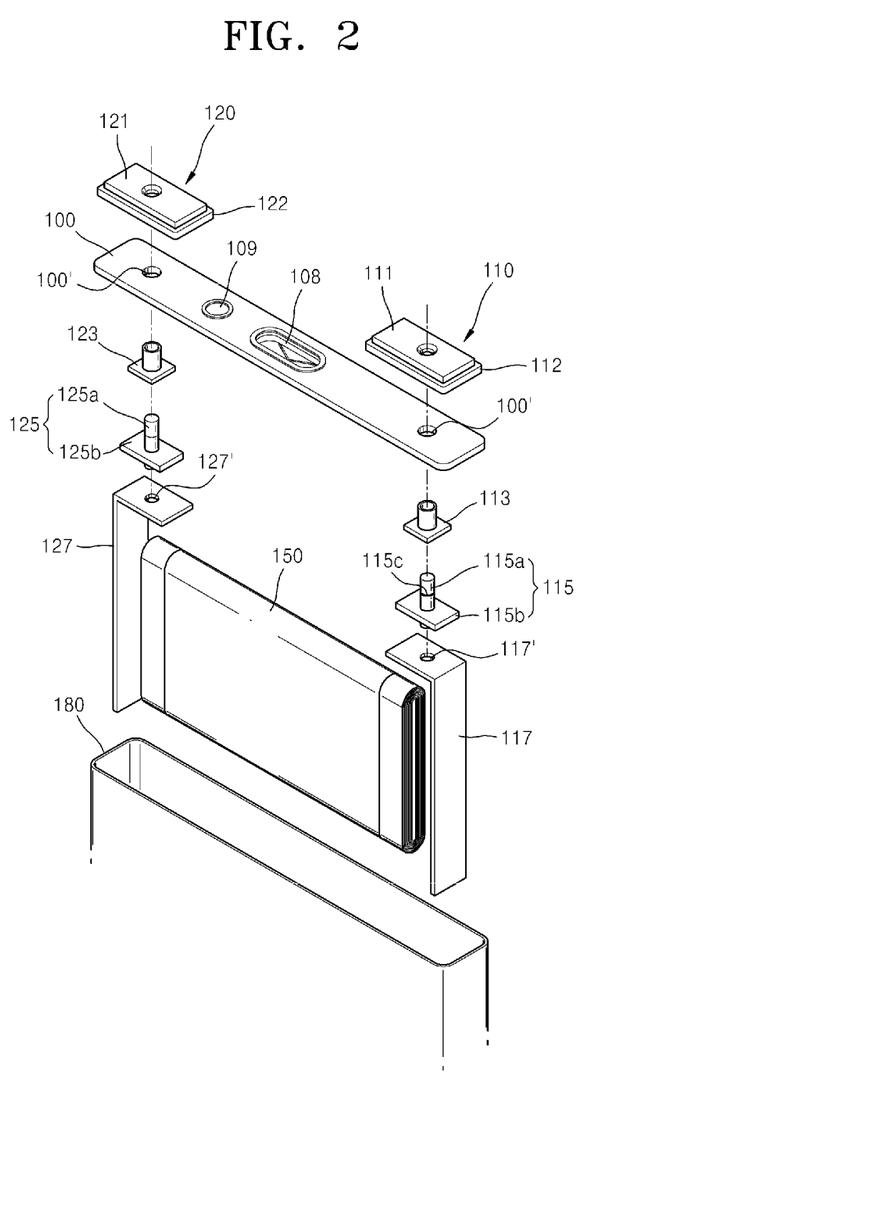
FIG. 2 is an exploded perspective view of the secondary battery of FIG. 1.

FIG. 1 is a perspective view of a secondary battery according to an embodiment of the present invention. FIG. 2 is an exploded perspective view of the secondary battery of FIG. 1.

Referring to FIGS. 1 and 2, a pair of first and second electrode terminals 110 and 120, having opposite polarities, may protrude from the secondary battery. For example, the first and second electrode terminals 110 and 120 are electrically coupled to an electrode assembly 150 accommodated (e.g., housed or enclosed) in the secondary battery, and may be respectively electrically coupled to a first electrode plate and a second electrode plate of the electrode assembly 150 to operate as a positive terminal and a negative terminal, respectively, for externally supplying discharge power accumulated in the secondary battery or for receiving charge power from outside the secondary battery. For example, the first and second electrode terminals 110 and 120 may be formed, respectively, on two sides (e.g., at opposing ends) of the secondary battery.

Alternatively, a cap plate 100 of the secondary battery may be electrically coupled to the electrode assembly 150 to operate as a terminal, and any of the first and second terminals 110 and 120 may be omitted.

Figure 3:
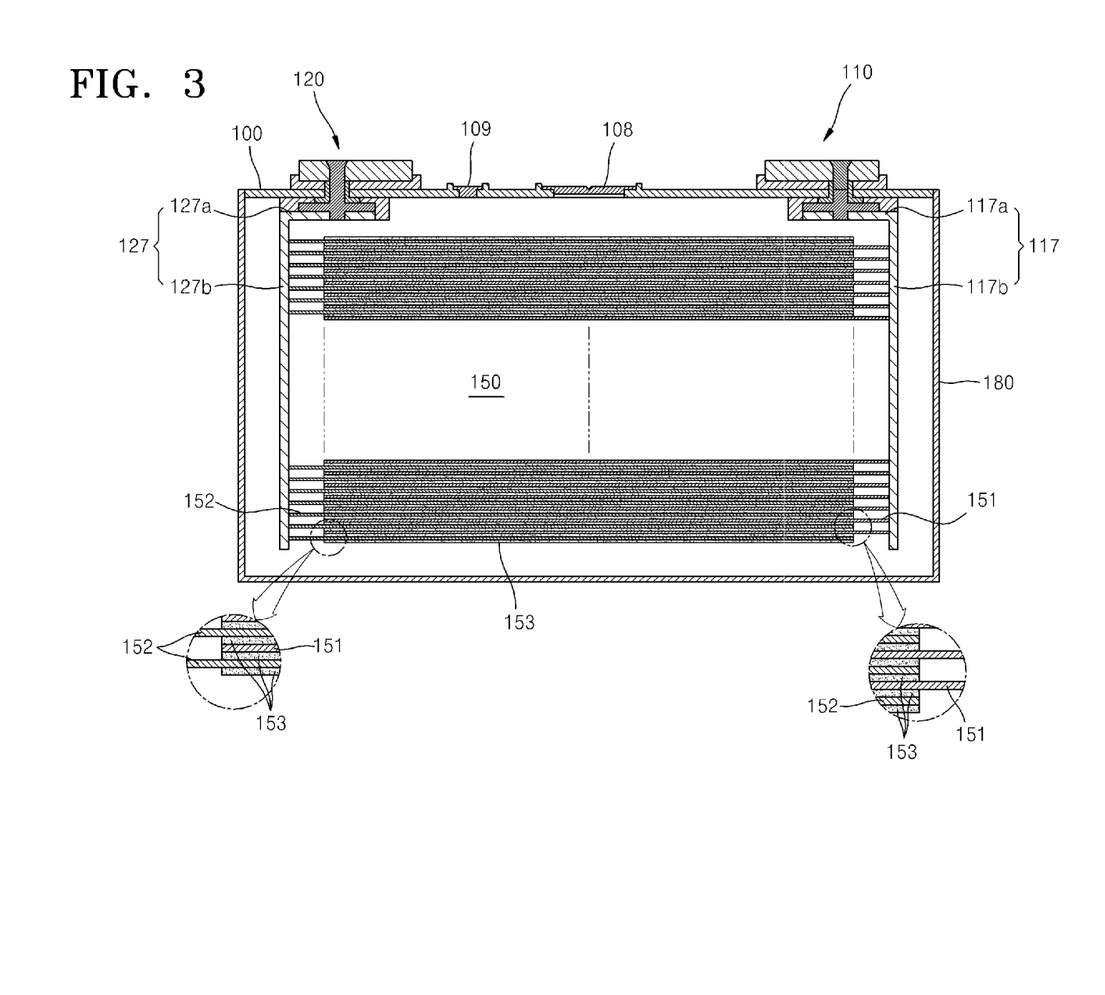
FIG. 3 is a cross-sectional view taken along the line III-III of FIG. 2.
Figure 4:
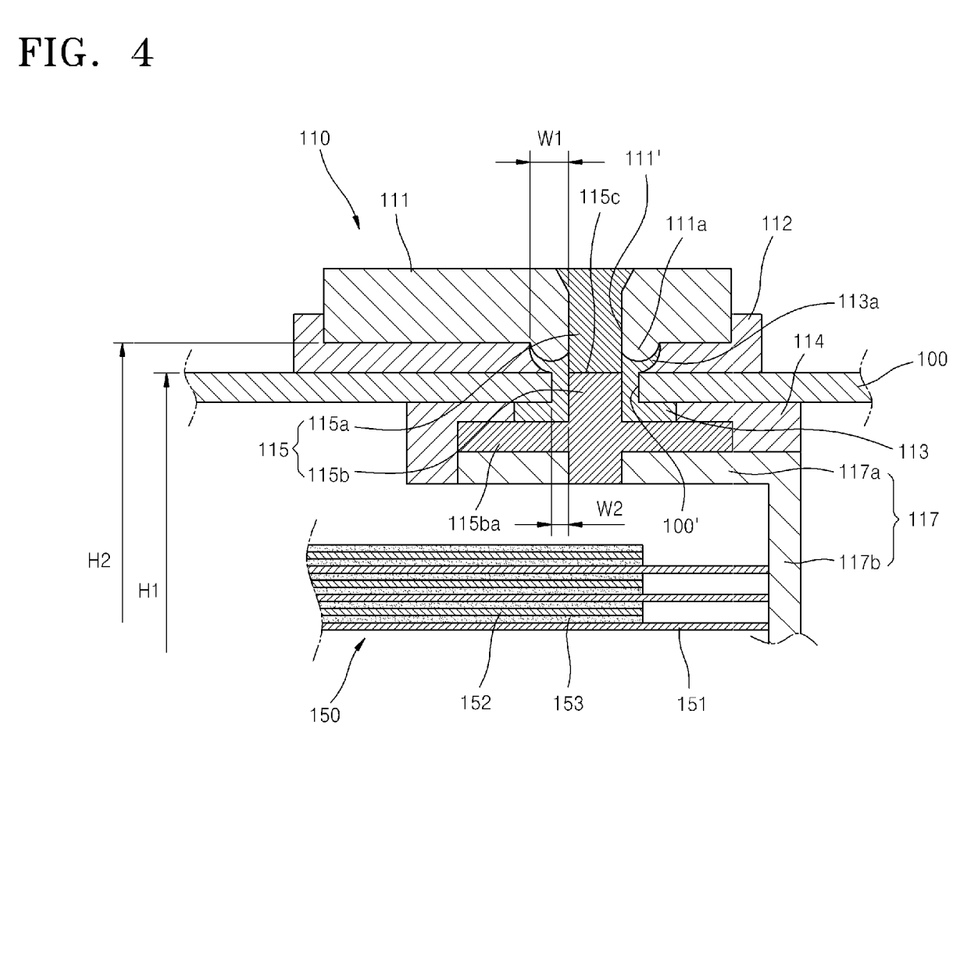
FIG. 4 is an enlarged cross-sectional view of a first electrode terminal of FIG. 3.
Figure 5:
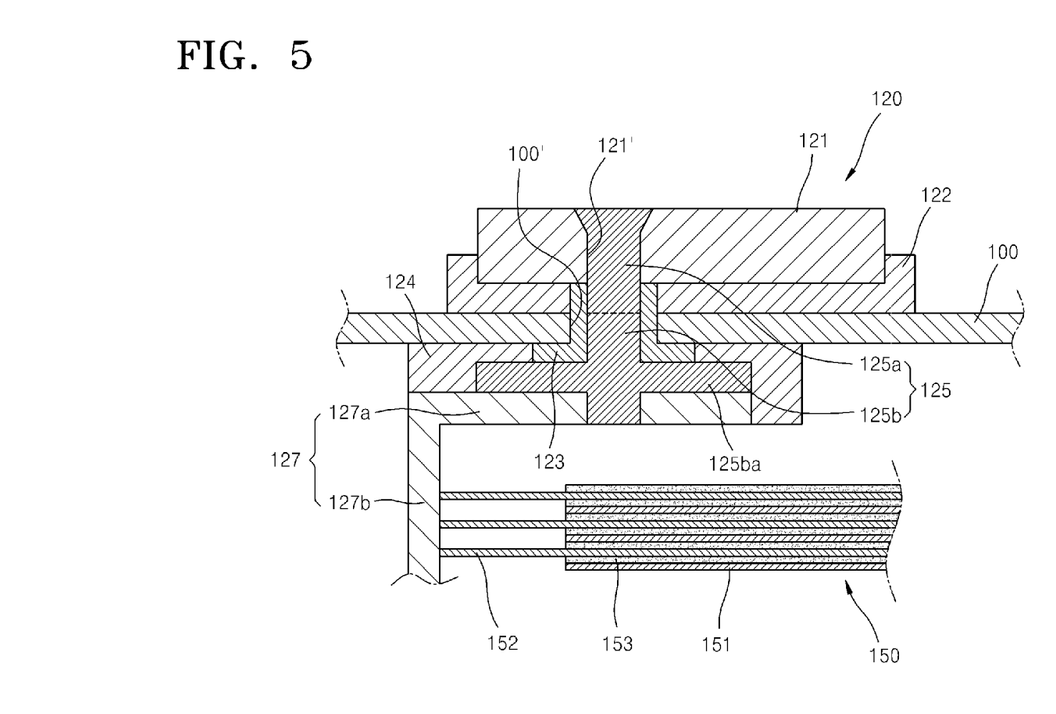
FIG. 5 is an enlarged cross-sectional view of a second electrode terminal of FIG. 3.

FIG. 3 is a cross-sectional view taken along the line III-III of FIG. 2. FIG. 4 is an enlarged cross-sectional view of the first electrode terminal 110 of FIG. 3, and FIG. 5 is an enlarged cross-sectional view of the second electrode terminal 120 of FIG. 3.

Referring to FIG. 3, the secondary battery includes the electrode assembly 150, the first and second electrode terminals 110 and 120, and first and second collector members 117 and 127 for electrically coupling the electrode assembly 150 to the first and second electrode terminals 110 and 120, respectively. Also, the secondary battery may include a case 180 accommodating (e.g., housing or substantially enclosing) the electrode assembly 150, and the cap plate 100 sealing an opening of the case 180 where the electrode assembly 150 is positioned or located. The cap plate 100 is combined, attached, or coupled to a top of the case 180 where the electrode assembly 150 is positioned, and may substantially seal the opening of the case 180. For example, the cap plate 100 and the case 180 may be welded along the edges of the cap plate 100.

The cap plate 100 may include a bent portion 108 that breaks to release an internal pressure during an abnormal operation wherein an internal pressure of the case 180 exceeds a pressure (e.g., a predetermined pressure), and a sealing portion 109 for substantially sealing an electrolyte injection hole.

The electrode assembly 150 may be accommodated or positioned in the case 180 of the secondary battery, and include first and second electrode plates 151 and 152 having opposite polarities, and a separator disposed between the first and second electrode plates 151 and 152. The electrode assembly 150 may have a wound structure wherein the first and second electrode plates 151 and 152, and the separator 153 are wound or rolled in a jelly roll shape. Alternatively, the electrode assembly 150 may have a stacked structure wherein the first and second electrode plates 151 and 152, and the separator 153 are alternately stacked on each other. The cap plate 100 may be attached or coupled to a top open portion of the case 180 accommodating the electrode assembly 150 so as to substantially seal the electrode assembly 150 within the case 180. The first and second electrode terminals 110 and 120 may be electrically coupled to the electrode assembly 150 and may be formed outside the cap plate 100 to electrically couple the electrode assembly 150 to an external circuit or electrical device (not shown) or to electrically couple the electrode assembly 150 to a neighboring secondary battery.

The first and second electrode terminals 110 and 120 may have opposite polarities, and may be respectively electrically coupled to the first and second electrode plates 151 and 152 of the electrode assembly 150.

Referring to FIGS. 4 and 5, the first electrode terminal 110 may include a first collector terminal 115, and a first terminal plate 111 combined or coupled to the first collector terminal 115. Similarly, the second electrode terminal 120 may include a second collector terminal 125 and a second terminal plate 121 combined or coupled to the second collector terminal 125. Hereinafter, collector terminals 115 and 125 may collectively denote the first and second collector terminals 115 and 125, or may selectively denote one of the first and second collector terminals 115 and 125. Also, terminal plates 111 and 121 may collectively denote the first and second terminal plates 111 and 121, or may selectively denote one of the first and second terminal plates 111 and 121. For example, the terminal plate 111 combined or coupled to the first collector terminal 115 may denote the first terminal plate 111, and the terminal plate 121 combined or coupled to the second collector terminal 125 may denote the second terminal plate 121. As will be described below, the first and second collector terminals 115 and 125 are respectively combined or coupled to the first and second collector members 117 and 127, and collector members 117 and 127 may collectively denote the first and second collector members 117 and 127, or may selectively denote one of the first and second collector members 117 and 127. For example, the collector member 117 combined to the first collector terminal 115 may denote the first collector member 117, and the collector member 127 combined to the second collector terminal 125 may denote the second collector member 127.

The first and second collector terminals 115 and 125 may extend at least partially outside the cap plate 100 through the cap plate 100. Accordingly, the cap plate 100 may include a terminal hole 100' into which the first and second collector terminals 115 and 125 are inserted and assembled. In detail, the first and second collector terminals 115 and 125 may be inserted through the terminal hole 100' of the cap plate 100 from bottom to top of the cap plate 100.

The first and second collector terminals 115 and 125 may include upper terminals 115a and 125a, which form top portions along length directions of the first and second collector terminals 115 and 125 and are combined or coupled to the first and second terminal plates 111 and 121, and lower terminals 115b and 125b, which form bottom portions of the first and second collector terminals 115 and 125 and are combined or coupled to the first and second collector members 117 and 127. For example, the upper terminals 115a and 125a may denote portions formed relatively close to the first and second terminal plates 111 and 121 along the length directions of the first and second collector terminals 115 and 125, and the lower terminals 115b and 125b may denote portions formed relatively close to the electrode assembly 150 along the length directions of the first and second collector terminals 115 and 125.

The first and second collector terminals 115 and 125 extend to penetrate through the cap plate 100, and may electrically couple the electrode assembly 150 below the cap plate 100 and the first and second terminal plates 111 and 121 above the cap plate 100 to each other. The lower terminals 115b and 125b of the first and second collector terminals 115 and 125 may be electrically coupled to the electrode assembly 150 through the first and second collector members 117 and 127 below the cap plate 100, whereas the upper terminals 115a and 125a of the first and second collector terminals 115 and 125 may be electrically coupled to the first and second terminal plates 111 and 121 above the cap plate 100.

The first and second collector terminals 115 and 125 may be respectively coupled to opposite polarities of the electrode assembly 150, and may have differentiated structures. Here, because the first and second collector terminals 115 and 125 are combined or coupled to different first and second metals of the electrode assembly 150 (or the first and second collector members 117 and 127 combined or coupled to the electrode assembly 150) according to the polarities, the first and second collector terminals 115 and 125 may have the differentiated structures to be combined or coupled to similar metals. By being combined or coupled to the similar metals, deterioration of binding strength, such as deterioration of welding joints, may be fundamentally prevented or reduced.

In detail, the upper and lower terminals 115a and 115b of the first collector terminal 115 of FIG. 4 may include different dissimilar metals. In other words, the upper terminal 115a may be formed by mainly using the first metal and the lower terminal 115b may be formed by mainly using the second metal different from the first metal. Unlike the first collector terminal 115, the upper and lower terminals 125a and 125b of the second collector terminal 125 of FIG. 5 may include same metals. In other words, the upper and lower terminals 125a and 125b may be formed by mainly using the second metal.

For reference, throughout the specification, when a component is formed of or includes a first or second metal, the first or second metal may be a certain metal or an alloy mainly including the certain metal. For example, the first metal may be aluminum or an aluminum alloy mainly including aluminum, and the second metal may be copper or a copper alloy mainly including copper.

A structure of the first collector terminal 115 will now be described first, and then a structure of the second collector terminal 125 will be described. Referring to FIG. 4, the upper terminal 115a of the first collector terminal 115 is combined or coupled to the first terminal plate 111, and the lower terminal 115b is combined or coupled to the first collector member 117. Here, the upper and lower terminals 115a and 115b are formed of different dissimilar metals, such that similar metals are combined or coupled between the first terminal plate 111 and the upper terminal 115a including the first metal, and similar metals are combined or coupled between the first collector member 117 and the lower terminal 115b including the second metal. Because the similar metals are combined or coupled between the first terminal plate 111, the first collector terminal 115, and the first collector member 117, which are mutually combined or coupled to each other, deterioration of binding strength caused due to combination or coupling of dissimilar metals, for example, welding of dissimilar metals, may be fundamentally prevented or reduced. Also, corrosion generated on an interface between different dissimilar metals may be prevented or reduced.

Throughout the specification, when the upper terminal 115a and the first terminal plate 111 of the first collector terminal 115, which are mutually combined or coupled to each other, are formed of the same type of the first metal, the first collector terminal 115 and the first terminal plate 111 may be both formed of the first metal or may mainly include the first metal.

Similarly, when the lower terminal 115b and the first collector member 117 of the first collector terminal 115, which are mutually combined or coupled to each other, are formed of the same type of second metal, the lower terminal 115b and the first collector member 117 may be both formed of the second metal or may mainly include the second metal.

The first collector terminal 115 may be formed by integrating the upper terminal 115a and the lower terminal 115b that include different dissimilar metals. For example, the upper terminal 115a and the lower terminal 115b may be combined or coupled to each other via any one of various combining or coupling methods, such as friction stir welding, riveting, caulking, spinning, press-fitting concave and convex portions, and screwing. For example, in the friction stir welding, when the upper and lower terminals 115a and 115b that include different dissimilar metals contact each other and are relatively rotated at a high speed, frictional heat is generated on an interface of the upper and lower terminals 115a and 115b and contacting portions of the upper and lower terminals 115a and 115b are locally melted and mixed (e.g., fused together), and thus the upper and lower terminals 115a and 115b may be strongly welded to each other.

Because the first terminal plate 111 and the first collector member 117 at the first collector terminal 115 are respectively formed of the first and second metals, which are different from each other, a so-called multi-metal terminal that includes different types of metals according to locations is formed. However, as shown in FIG. 5, because the second terminal plate 121 and the second collector member 127 at the second collector terminal 125 are formed of the second metal, the second collector terminal 125 may be formed of a single material including the second metal. In detail, the upper and lower terminals 125a and 125b of the second collector terminal 125 may include the second metal.

In more detail, the first collector terminal 115 may correspond to a negative terminal, and thus the first collector member 117 and the first terminal plate 111, which are coupled to the first collector terminal 115, may form a negative region. Here, the first collector member 117 may be formed of copper like the negative region of the electrode assembly 150, and the first terminal plate 111 may be formed of aluminum. Also, the upper terminal 115a of the first collector terminal 115, which electrically couples the first collector member 117 to the first terminal plate 111, may include aluminum, and the lower terminal 115b may include copper. Accordingly, the upper terminal 115a of the first collector terminal 115 and the first terminal plate 111 may be combined or coupled to each other between similar metals, i.e., aluminum, and the lower terminal 115b of the first collector terminal 115 and the first collector member 117 may be combined or coupled to each other between similar metals, i.e., copper.

Meanwhile, a positive region and a negative region of the first and second terminal plates 111 and 121 may be both formed of aluminum. For example, in a module structure wherein a plurality of secondary batteries are electrically coupled to each other, the first and second terminal plates 111 and 121 of the neighboring secondary batteries may be electrically coupled to each other through a bus bar (not shown), and thus the neighboring secondary batteries are coupled to each other in series. Accordingly, the first and second terminal plates 111 and 121 may be formed of aluminum like the bus bar.

The second terminal plate 121 may correspond to a positive terminal, and thus the second collector member 127 and the second terminal plate 121, which are coupled to the second collector terminal 125, may form a positive region. Here, the second collector member 127 may be formed of aluminum like the positive region of the electrode assembly 150, and the second terminal plate 121 may also be formed of aluminum. Also, by forming both the upper and lower terminals 125a and 125b of the second collector terminal 125, which electrically couples the second collector member 127 to the second terminal plate 121, to each other using aluminum, the upper terminal 125a of the second collector terminal 125 and the second terminal plate 121 may be combined or coupled to each other using similar metals, e.g., aluminum or an aluminum alloy, and the lower terminal 125b of the second collector terminal 125 and the second collector member 127 may be combined or coupled to each other using similar metals, e.g., aluminum or aluminum alloy.

The first and second collector terminals 115 and 125 extend to penetrate through the cap plate 100, and electrically couple the first and second collector members 117 and 127 below the cap plate 100 and the first and second terminal plates 111 and 121 above the cap plate 100 to each other. Also, the first and second collector terminals 115 and 125 include the lower terminals 115b and 125b combined or coupled to the first and second collector members 117 and 127 below the cap plate 100, and the upper terminals 115a and 125a combined or coupled to the first and second terminal plates 111 and 121 above the cap plate 100.

The upper terminals 115a and 125a may fix (or secure) locations of the first and second collector terminals 115 and 125, for example, with respect to top surfaces of the first and second terminal plates 111 and 121 via a riveting method. In detail, a length (e.g., a predetermined length) of the upper terminals 115a and 125a may protrude from the top surface of the cap plate 100 to penetrate through the first and second terminal plates 111 and 121, and may pressurize and contact the top surfaces of the first and second terminal plates 111 and 121 to be combined to the first and second terminal plates 111 and 121. A concave groove (not shown) may be formed on a top of each of the upper terminals 115a and 125a according to pressurization of a processing tool (not shown) that rotates at a high speed, and the tops of the upper terminals 115a and 125a may adhere to the top surfaces of the first and second terminal plates 111 and 121 while being forced in a lateral direction, according to the pressurization of the processing tool. For example, concave grooves (not shown) may be formed on inner tops of the upper terminals 115a and 125a, thereby allowing flange shapes to extend in a lateral direction at outer tops of the upper terminals 115a and 125a after applying the pressurization of the processing tool to the upper terminals 115a and 125a.

The lower terminals 115b and 125b may respectively include stoppers 115b a and 125b a having a flange shape extending in a wider outer circumference than the terminal hole 100', such that the first and second collector terminals 115 and 125 do not slip through the terminal hole 100' of the cap plate 100. Here, the first and second collector terminals 115 and 125 are assembled to be inserted into the terminal hole 100' from the bottom of the cap plate 100, and the locations of the first and second collector terminals 115 and 125 may be fixed by riveting the tops of the upper terminals 115a and 125a exposed above the cap plate 100 while the first and second collector terminals 115 and 125 are supported below the cap plate 100 through the stoppers 115b a and 125b a of the lower terminals 115b and 125b.

The first and second collector terminals 115 and 125 may be inserted into the terminal hole 100' of the cap plate 100 while being electrically insulated from the cap plate 100. For example, seal gaskets 113 and 123 may be inserted into the terminal hole 100', and the first and second collector terminals 115 and 125 may be insulated from the cap plate 100 as the first and second collector terminals 115 and 125 are inserted into the terminal hole 100' through the seal gasket 113 and 123. The seal gaskets 113 and 123 seal around the terminal hole 100' so as to prevent an electrolyte in the case 180 from leaking, and also to prevent external impurities or contaminants from penetrating into the case 180.

According to an embodiment, the first collector terminal 115 may be a multi-metal terminal including different dissimilar metals. Here, the seal gasket 113 formed along or around a circumference of the first collector terminal 115 may prevent corrosion between the dissimilar metals by covering and protecting an interface 115c of the upper and lower terminals 115a and 115b formed of the dissimilar metals and blocking moisture. In detail, the seal gasket 113 surrounds a side surface of the first collector terminal 115 so as to hermetically seal the side surface of the first collector terminal 115 and the terminal hole 100'. The seal gasket 113 covers the interface 115c of the upper and lower terminals 115a and 115b so that external harmful materials, such as moisture, do not penetrate into the interface 115c. When the interface 115c has a height H1 so that the interface 115c is not exposed, a top 113a of the seal gasket 113 may have a height H2 at least higher than the height H1. In other words, because the seal gasket 113 covers the height H2 higher than the height H1, the seal gasket 113 may sufficiently cover the interface 115c. Here, the heights H1 and H2 may be measured along the length direction of the first collector terminal 115, and a level of measuring the heights H1 and H2 are not limited, and for example, the heights H1 and H2 may be measured from a bottom surface of the secondary battery.

Figure 6:
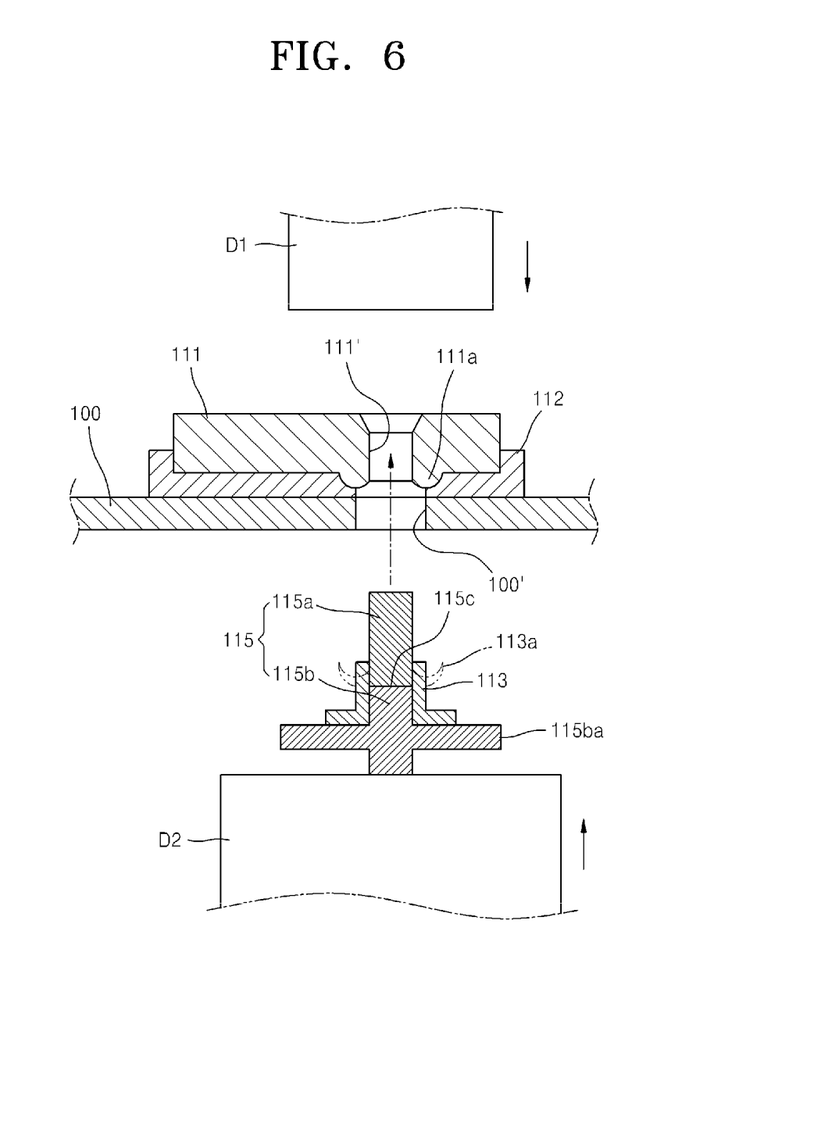
FIG. 6 is a view for describing forming of an upper portion of a seal gasket of FIG. 4.

The top 113a of the seal gasket 113 has a flange shape extending in the lateral direction substantially parallel to the first terminal plate 111. As shown in FIG. 6, the top 113a may have the flange shape as the top 113a is pressed in the lateral direction according to downward pressurization of the first terminal plate 111 while the first terminal plate 111 and the first collector terminal 115 are combined or coupled to each other via pressurization from upper and lower dies D1 and D2. For example, the top of the upper terminal 115a is pressurized and compressed to the top surface of the first terminal plate 111 while pressing the first terminal plate 111 downward. Accordingly, the top 113a of the seal gasket 113 touching a protruding portion 111a of the first terminal plate 111 is pressed and pushed to the lateral side, and thus forms the flange shape at the bottom surface of the first terminal plate 111.

Figure 7:
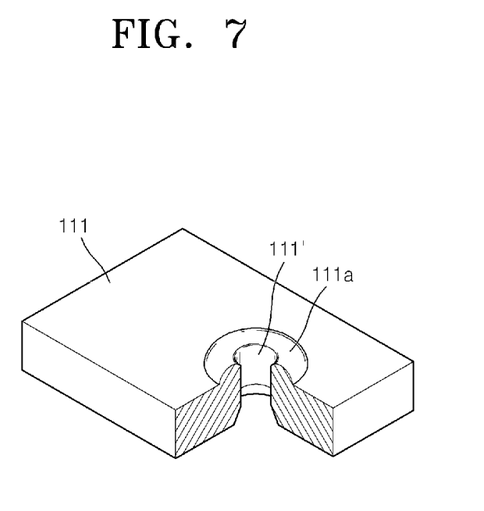
FIG. 7 is a view of a shape of a protruding portion of a terminal plate, according to an embodiment of the present invention.

The protruding portion 111a may be formed to press the seal gasket 113, around a terminal hole 111' of the first terminal plate 111. As shown in FIG. 7, the protruding portion 111a may be formed along a circumference of the terminal hole 111', or along an outer circumference of the terminal hole 111' according to a circular shape of the terminal hole 111'. The protruding portion 111a may protrude downward from a bottom surface of the first terminal plate 111, i.e., towards a direction of the seal gasket 113. The protruding portion 111a may be continuously formed along or around the circumference of the terminal hole 111', but is not limited thereto. Alternatively, the protruding portion 111a may be locally formed on a part of the circumference of the terminal hole 111' or intermittently formed along the circumference of the terminal hole 111' while pressing the top 113a of the seal gasket 113.

Returning to FIG. 4, the protruding portion 111a may press the top 113a of the seal gasket 113 so that the top 113a has the flange shape. In other words, the protruding portion 111a locally presses the top 113a of the seal gasket 113 so that the top 113a has the flange shape, and may compactly seal around the first terminal plate 111 adjacent to the seal gasket 113 or around an upper insulating member 112 adjacent to the seal gasket 113. When the top 113a of the seal gasket 113 is locally pressed, moisture may be effectively prevented from penetrating through the top 113a of the seal gasket 113, and when the top 113a of the seal gasket 113 has a wide flange shape, a path of moisture penetration may be long, and thus moisture penetration may be suppressed or delayed.

The top 113a of the seal gasket 113 contacts the bottom surface of the first terminal plate 111, wherein a width W1 of the top 113a contacting the bottom surface of the first terminal plate 111 is wider than a width across a perimeter of the seal gasket 113, and thus the top 113a has the flange shape. In detail, the width W1 of the top 113a contacting the first terminal plate 111 is wider than a width W2 of the seal gasket 113 around a terminal hole 110' surrounding the first collector terminal 115. Because the top 113a of the seal gasket 113 is widely formed in the flange shape, the path of the moisture penetration may be relatively long, thereby effectively suppressing or reducing the moisture penetration. Meanwhile, the top 113a of the seal gasket 113 contacts the bottom surface of the first terminal plate 111, wherein a part of the top 113a may be compressed between the first terminal plate 111 and the upper insulating member 112.

The protruding portion 111a of the first terminal plate 111 and the flange shape of the top 113a of the seal gasket 113 may operate to protect the first collector terminal 115 (which is a multi-metal terminal), by forming an effective corrosion preventing (or reducing) structure to protect the interface 115c from moisture or other contaminants. Such a corrosion preventing structure may also be applied to the second collector terminal 125 formed of the similar metals so as to suppress moisture penetration and prevent or reduce corrosion. According to an embodiment, the protruding portion 111a and the flange shape of the top 113a may be selectively applied to the first collector terminal 115 that is a multi-metal terminal that may need to be protected from moisture and prevented from being corroded.

Referring to FIGS. 4 and 5, lower insulating members 114 and 124 may be disposed between the first and second collector terminals 115 and 125 and the cap plate 100, and may insulate the first and second collector members 117 and 127 from the cap plate 100. The seal gaskets 113 and 123 are disposed around the terminal holes 100' through which the first and second collector terminals 115 and 125 penetrate, and the lower insulating members 114 and 124 are disposed between the first and second collector terminals 115 and 125 and the cap plate 100, and thus the first and second collector terminals 115 and 125 may be insulated from the cap plate 100. The lower insulating members 114 and 124 may be extended between the first and second collector members 117 and 127 and the cap plate 100.

The first and second collector terminals 115 and 125 may be electrically coupled to the electrode assembly 150 through the first and second collector members 117 and 127. The first and second collector members 117 and 127 may include first and second collector plates 117b and 127b that form bottom portions of the first and second collector members 117 and 127 and are combined or coupled to the electrode assembly 150, and first and second lead portions 117a and 127a that form top portions of the first and second collector members 117 and 127 and are combined or coupled to the first and second collector terminals 115 and 125.

The first and second collector plates 117b and 127b may be respectively combined or coupled to two edges of the electrode assembly 150, and may be welded to an active-material-non-coated portion formed on the edge of the electrode assembly 150, i.e., active-material-non-coated portions of the first and second electrode plates 151 and 152 where an electrode active material is not formed. For example, the first collector plate 117b may be combined or coupled to the active-material-non-coated portion of the first electrode plate 151, and the second collector plate 127b may be combined or coupled to the active-material-non-coated plate of the second electrode plate 152.

The first and second lead portions 117a and 127a may bend and extend from the first and second collector plates 117b and 127b to face the first and second collector terminals 115 and 125, and may have terminal holes 117' and 127' (shown, e.g., in FIG. 2) for coupling the first and second lead portions 117a and 127a to the first and second collector terminals 115 and 125, respectively. For example, bottom portions of the first and second collector terminals 115 and 125 may be inserted into the terminal holes 117' and 127' of the first and second lead portions 117a and 127a, and welding may be performed around the terminal holes 117' and 127' where the first and second collector terminals 115 and 125 and the first and second lead portions 117a and 127a contact each other so as to combine or couple the first and second collector terminals 115 and 125 and the first and second lead portions 117a and 127a to each other.

The first and second terminal plates 111 and 121 may be disposed on the cap plate 100. The first and second terminal plates 111 and 121 may be electrically coupled to the first and second collector terminals 115 and 125, and may provide wider terminal regions than the first and second collector terminals 115 and 125. The first and second terminal plates 111 and 121 may be coupled to the first and second collector terminals 115 and 125 via riveting, but alternatively, the first and second terminal plates 111 and 121 may be coupled to the first and second collector terminals 115 and 125 via any one of various methods, such as welding and screwing.

The first and second terminal plates 111 and 121 may have terminal holes 111' and 121' through which the first and second collector terminals 115 and 125 penetrate through. For example, the protruding portion 111a for pressing the seal gasket 113 may be formed around the terminal hole 111' of the first terminal plate 111. In detail, the protruding portion 111a protruding downwards, i.e., towards the seal gasket 113, is formed on the bottom surface of the first terminal plate 111. For example, the protruding portion 111a may extend along the outer circumference of the terminal hole 111' according to the circular shape of the terminal hole 111'. By continuously forming the protruding portion 111a around the terminal hole 111', locations around the top 113a of the seal gasket 113 inserted into the terminal hole 100' may be pressed such that the top 113a of the seal gasket 113 has an overall flange shape, which may reduce or prevent moisture or external contaminants from penetrating past the seal gasket 113. Also, by continuously forming the protruding portion 111a along the circumference of the terminal hole 111', the upper portion of the seal gasket 113 may be pressed in overall such that the first terminal plate 111 adjacent to the seal gasket 113 or the upper insulating member 112 adjacent to the seal gasket 113 tightly contacts the seal gasket 113. Alternatively, the protruding portion 111a may be continuously or intermittently formed along the circumference of the terminal hole 111' or may be formed on a local location along the circumference of the terminal hole 111' as long as the top 113a of the seal gasket 113 inserted into the terminal hole 100' is pressed.

Upper insulating members 112 and 122 may be disposed between the first and second terminal plates 111 and 121 and the cap plate 100. The upper insulating members 112 and 122 may insulate the first and second terminal plates 111 and 121 from the cap plate 100. According to another embodiment, the upper insulating members 112 and 122 may be omitted if the first and second terminal plates 111 and 121 and the cap plate 100 have a same polarity.

As described above, according to the one or more of the above embodiments of the present invention, corrosion that may be generated on an interface between dissimilar metals of a collector terminal can be fundamentally prevented or reduce by using a seal gasket insulating the collector terminal to protect the interface between the dissimilar metals in case of introducing the collector terminal formed of a multi-metal terminal to increase a binding strength and workability through binding of similar metals.

It should be understood that the exemplary embodiments described herein should be considered in a descriptive sense only and not for purposes of limitation. Descriptions of features or aspects within each embodiment should typically be considered as available for other similar features or aspects in other embodiments.

Further, although exemplary embodiments of the present invention have been described, it should be understood that the present invention should not be limited to these exemplary embodiments, but various changes and modifications can be made by one having ordinary skill in the art within the spirit and scope of the appended claims, and their equivalents.

What is claimed is:

1. A secondary battery comprising:
an electrode assembly;
a case housing the electrode assembly and having a case opening;
a cap plate substantially sealing the case opening;
a first terminal plate on the cap plate;
a first collector terminal coupling the electrode assembly to the first terminal plate;
a seal gasket between the first collector terminal and the cap plate; and
an insulating member between the first terminal plate and the cap plate, wherein the seal gasket extends between the insulating member and a protruding portion of the first terminal plate along a direction perpendicular to a top surface of the cap plate, and
wherein the first collector terminal comprises:
a lower terminal adjacent the electrode assembly, and
an upper terminal adjacent the first terminal plate, the upper terminal comprising a first metal different from a second metal of the lower terminal, and contacting the lower terminal at an interface between the first metal and the second metal, and
wherein the seal gasket covers at least a portion of a side surface of the interface between the first metal and the second metal.

2. The secondary battery of claim 1, wherein the first collector terminal extends at least partially through a terminal hole of the cap plate, and the seal gasket is along a side surface of the terminal hole.

3. The secondary battery of claim 1, wherein the first terminal plate comprises the protruding portion protruding toward the seal gasket and around a terminal hole of the first terminal plate.

4. The secondary battery of claim 3, wherein the protruding portion is continuous along a periphery of the terminal hole.

5. The secondary battery of claim 1, wherein the seal gasket contacts the first terminal plate and comprises a flange-shaped upper portion.

6. A secondary battery comprising:
an electrode assembly;
a case housing the electrode assembly and having a case opening;
a cap plate substantially sealing the case opening;
a first terminal plate on the cap plate;
a first collector terminal coupling the electrode assembly to the first terminal plate;
a seal gasket between the first collector terminal and the cap plate; and
an insulating member between the first terminal plate and the cap plate, wherein the seal gasket extends between the insulating member and a protruding portion of the first terminal plate, and
wherein the first collector terminal comprises:
a lower terminal adjacent the electrode assembly, and
an upper terminal adjacent the first terminal plate, the upper terminal comprising a first metal different from a second metal of the lower terminal, and contacting the lower terminal at an interface between the first metal and the second metal, and
wherein the seal gasket covers at least a portion of a side surface of the interface between the first metal and the second metal,
wherein the seal gasket contacts the first terminal plate and comprises a flange-shaped upper portion, and
wherein at least a portion of an upper portion of the seal gasket is compressed between the first terminal plate and the insulating member.

7. The secondary battery of claim 5, wherein a width of the upper portion of the seal gasket is larger than a width of a portion of the seal gasket in a terminal hole of the cap plate.

8. The secondary battery of claim 1, wherein the seal gasket extends along a length direction of the first collector terminal and covers at least the interface between the first metal and the second metal.

9. The secondary battery of claim 8, wherein at least a portion of an upper portion of the seal gasket is vertically offset above the interface between the first metal and the second metal.

10. The secondary battery of claim 1, wherein the upper terminal is compressed and fixed with respect to a top surface of the first terminal plate, and the lower terminal is coupled to a first collector member that is electrically coupled to the electrode assembly.

11. The secondary battery of claim 10, wherein a top of the upper terminal has a flange shape for engaging the first terminal plate.

12. The secondary battery of claim 10, wherein the lower terminal comprises a stopper having a width greater than a terminal hole of the cap plate, and wherein the first collector terminal extends through the terminal hole.

13. The secondary battery of claim 10, wherein the first terminal plate comprises a metal substantially similar to the first metal, and the first collector member comprises a metal substantially similar to the second metal.

14. The secondary battery of claim 1, further comprising a second collector terminal having a polarity different from a polarity of the first collector terminal.

15. The secondary battery of claim 14, wherein the second collector terminal extends through the cap plate to electrically couple the electrode assembly to a second terminal plate, and the second collector terminal further comprises a lower terminal adjacent the electrode assembly and an upper terminal adjacent the second terminal plate.

16. The secondary battery of claim 15, wherein the lower terminal and the upper terminal of the second collector terminal comprise a same metal or substantially similar metals.

17. The secondary battery of claim 15, wherein the upper terminal of the second collector terminal is compressed and fixed with respect to a top surface of the second terminal plate, and the lower terminal of the second collector terminal is coupled to a second collector member that is electrically coupled to the electrode assembly.

18. The secondary battery of claim 17, wherein the upper terminal and the lower terminal of the second collector terminal comprise a same metal or substantially similar metals as the second terminal plate and the second collector member.

* * * * *